US006126038A

United States Patent [19]

Olegnowicz

[11] Patent Number: 6,126,038

[45] Date of Patent: Oct. 3, 2000

[54] ATOMIZING PUMP SPRAY

[76] Inventor: Israel Olegnowicz, 360 Jeffers Dr., Charlottesville, Va. 22911

[21] Appl. No.: 09/183,492

[22] Filed: Oct. 30, 1998

[51] Int. Cl.[7] .............................. B65D 88/54; G01F 11/06

[52] U.S. Cl. ......................... 222/1; 222/321.7; 222/321.9; 239/338

[58] Field of Search .............................. 222/321.1, 321.2, 222/321.7, 321.9, 341, 385, 1; 239/329, 331, 333, 338, 340, 8

[56] References Cited

U.S. PATENT DOCUMENTS

| | | | |
|---|---|---|---|
| 3,331,559 | 7/1967 | Fedit | 239/333 |
| 3,399,836 | 9/1968 | Pechstein | 239/333 |
| 3,861,564 | 1/1975 | Loeffler | 222/80 |
| 4,025,046 | 5/1977 | Boris | 239/333 |
| 4,271,990 | 6/1981 | Kutik et al. | 222/321.8 |
| 4,389,003 | 6/1983 | Meshberg . | |
| 4,606,479 | 8/1986 | Van Brocklin . | |
| 5,025,958 | 6/1991 | Montaner et al. | 222/321.2 |
| 5,073,165 | 12/1991 | Edwards | 604/72 |
| 5,626,264 | 5/1997 | Florez et al. | 222/321.2 |
| 5,697,530 | 12/1997 | Montaner et al. | 222/321.2 |

*Primary Examiner*—James Hook
*Assistant Examiner*—Sean P. O'Hanlon
*Attorney, Agent, or Firm*—Sheldon H. Parker

[57] ABSTRACT

The invention relates to a manual, self-priming precompression spray pump, which employs a minimal number of different parts. The assembly includes a container for the liquid, a cap, a conventional spray nozzle unit, a valve member, a piston, a spring and a cylinder for housing the piston and providing a compression chamber. The valve upper end functions as an outlet valve and the valve lower end functions as an inlet valve. The spring is a compound spring and serves to force the valve outlet end into a constant sealing engagement with the interior of the piston, and to resist the compression movement of the piston. The cylinder for housing the piston includes an inner, concentric valve cylinder. The inner cylindrical wall has an axial length which terminates short of the chevron valve when said valve member and said piston are fully biased away from said inlet valve, whereby said chevron valve is in a position outside of said inner cylindrical wall. Thus, at this extreme position, the inlet valve is fully open for cooperation with said piston cylinder inlet end to restrict liquid flow from out of said piston compression chamber and through said piston cylinder inlet end.

22 Claims, 7 Drawing Sheets

ATOMIZING PUMP SPRAY

BACKGROUND OF THE INVENTION

1. Field of the Invention

This invention relates generally to a precompression pump sprayer, and more particularly to a pump chamber priming arrangement for such sprayer and a simplified component arrangement.

2. Brief Description of the Prior Art

Self priming precompression pumps have undergone changes over the years, primarily for the purpose of producing improved valve structures, more effective self priming, improved reliability, reduced cost, and ease of manufacture. Over the years, prior art pump designs have undergone improvement and provided enhanced features.

It is an object of the present invention, to provide a new concept in pump designs, in order to provide a new advancement with respect to ease of use, reliability, reduced cost, and ease of manufacture.

SUMMARY OF THE INVENTION

The invention relates to a manual, self-priming precompression spray pump, which employs a minimal number of different parts. Consequently, the device is highly reliable and low in cost of manufacture. A pump sprayer of this type comprises a chamber where liquid is drawn by means of a piston or plunger into a sealed chamber, and then released under pressure through an outlet valve. In general the plunger is driven by a stainless steel spring, and in many cases the same spring force is used to seal the outlet valve. This occurs in varied configurations, having variations related to both the outlet and inlet valves. In other cases the outlet valve pressure is controlled separately, usually by a separate, smaller spring. There are advantages to controlling the outlet valve separately. Among them is the dispensing of a range of volumes and viscosities of liquids and gels, as well as better control over the dosage. The drawback with the separate control is the greater number of components, leading to higher cost of production and assembly. The present invention seeks to improve prior art by controlling separately the plunger and sealing forces in the pump by use of a novel design and a single dual action spring, using a minimum number of parts.

The entire assembly includes a container for the liquid which is to be dispensed, a cap for closing the open end of the container, a conventional spray nozzle unit, a valve member, a piston, a spring and a cylinder for housing the piston and providing a compression chamber. The valve upper end functions as an outlet valve and the valve lower end functions as an inlet valve. The spring is a compound spring and serves two, independently variable functions. It serves both to force the valve outlet end into a constant sealing engagement with the interior of the piston, and to resist the compression movement of the piston. The user applies pressure to the spray nozzle cap that is in contact with the piston thus putting it through the compression cycle and the spring returns the piston to its rest position.

The cylinder for housing the piston includes an inner, concentric valve cylinder. The inlet valve end of the valve member is dimensioned to slidably receive the inlet valve end of the valve member. The compound spring has one end seated on the seat which is formed where the inner concentric valve cylinder is joined to the outer cylinder, the piston housing cylinder.

The pump assembly includes a piston cylinder, a piston, a valve, and a compound spring. The compound spring has a first region and a second region, with the first region being compressible independent of the second region. The first region has a first end loop and a second end loop, and the second region also has a first end loop and a second end loop.

The piston is adapted for reciprocal motion within the piston cylinder. The piston cylinder has an interior compression chamber and a valved leading from outlet the compression chamber. The valve member is positioned within the piston cylinder and has an outlet valve end adapted for fluid tight engagement with the piston cylinder valved outlet. The compound spring has a first end biased against the piston cylinder. The compound spring first region first loop end is in engagement with said valve member outlet valve end and biases the valve member for engagement with the piston valved outlet, and said second end is biased against the compound spring second region. The compound spring second region, first loop end is in engagement with the piston and the second region second loop end is biased against the piston cylinder.

Thus, movement of the piston during a compression stroke is resisted by the compound spring second region and the movement of said valve member outlet valve end is independently biased toward said piston valved outlet by said compound spring first region.

Another feature of the invention is providing the piston with an annular groove. The compound spring second region, first loop is mounted in the annular groove so as to provide a fixed engagement between the piston and the compound spring second region, allowing a constant and separate force of closure.

A further feature of the invention is providing the valve member with an annular groove at its valve outlet end. The compound spring first region, first loop is mounted in the annular groove for fixed engagement between said compound spring first region and said valve member.

In another feature of the invention, the piston cylinder has an inlet end, and the valve member has a valve inlet end. The valve member inlet end is adapted for cooperation with the piston cylinder inlet end to restrict liquid flow from out of said piston compression chamber and through said piston cylinder inlet end. The piston cylinder has an outer cylindrical wall and a concentric inner cylindrical wall, with the valve member inlet end being positioned for reciprocal movement within the piston cylinder inner cylindrical wall.

Preferably, the valve member inlet end is a chevron valve having an annular skirt, such that the annular skirt has a increasing diameter in the direction away from said inlet end.

A further feature of the invention relates to the spray pump assembly being self-priming. At least one vent groove is provided on the inner surface of the concentric inner cylindrical wall, such that at least one vent groove is positioned for cooperation with said chevron valve during the final portion of the reciprocal movement of said valve member within said piston cylinder inner cylindrical wall, to provide an air flow by pass around the inlet valve. Thus, during the priming step, air is forced into the container, rather than being vented to the atmosphere. Another feature of the invention is a dip tube entry placed eccentric to the upper cylinder to be in alignment with the priming grove.

The inner cylindrical wall has an axial length which terminates short of the chevron valve when said valve member and said piston are fully biased away from said inlet valve, whereby said chevron valve is in a position outside of said inner cylindrical wall. Thus, at this extreme position, the inlet valve is fully open for cooperation with said piston cylinder inlet end to restrict liquid flow from out of said piston compression chamber and through said piston cylinder inlet end.

DESCRIPTION OF THE PREFERRED EMBODIMENTS OF THE INVENTION

Figure 1:
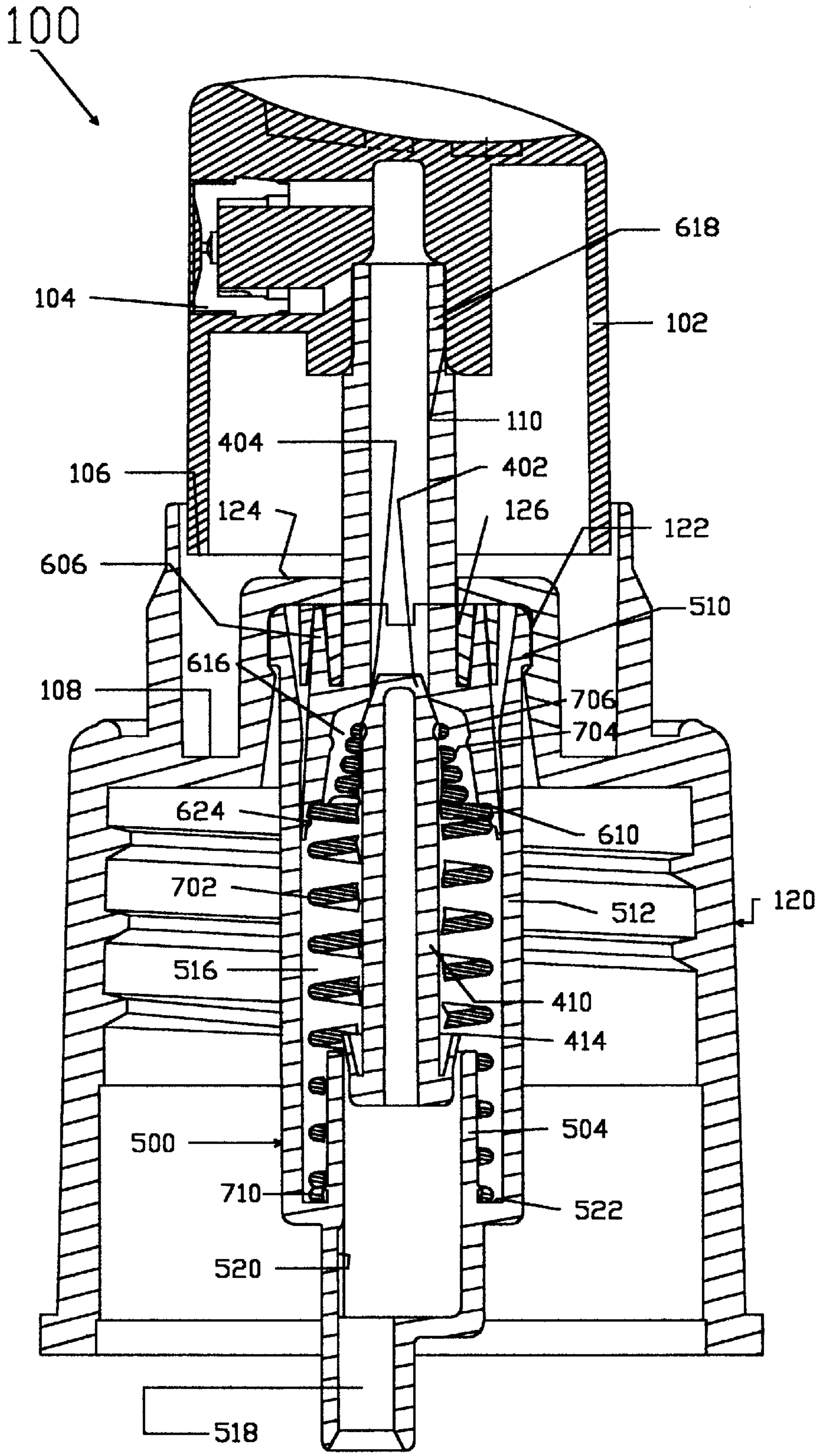
FIG. 1 is a fragmentary cross-sectional view of a spray pump device, showing the spray cap, and pump mechanism in its normal state.

The pump spray assembly 100, illustrated in FIG. 1, includes the essential elements of the invention. Not illustrated is the container, which component is well known in the art. The spray cap 102 is provided with a convex upper surface for receiving the finger of the user, and a spray nozzle 104. The interior of the nozzle is provided with a piston receiving notch 110 dimensioned to receive the piston head 618. The spray cap 102 moveably sits within the container cap 120 that in turn is affixed to the container. The distal end of the container cap 120 is dimensioned to receive the lower edge of the spray cap 102. The downward vertical movement of the spray cap 102 is stopped by the cap ledge 124 while the upward vertical movement is controlled by the interaction between the spray cap 102 and the piston 600. The interior of the proximal end of the container cap 120 is provided with a flange indent 122 and to receive the flanged rim 510 as described hereinafter. A container seal 126 provides a secure seal. The spray cap 102 is mounted over the piston head 618 with the sides of the receiving notch resting on the seat 604.

Figure 6:
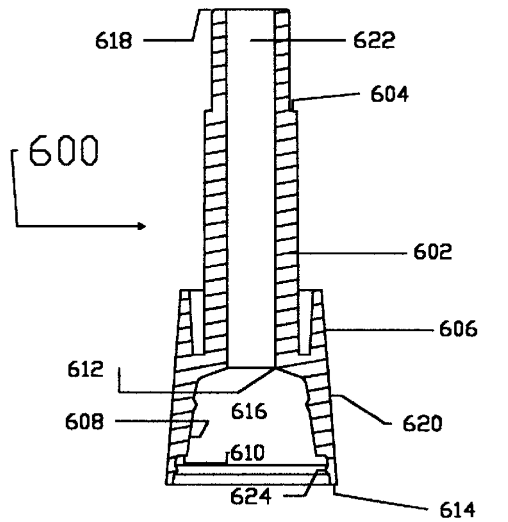
FIG. 6, is a cross-sectional view of the piston element of the spray pump of FIG. 1.

As best seen in FIG. 6, the piston 600 is an elongated member with the reduced diameter head 618 at the upper end and an upper compression chamber 616 at the lower end. The piston head 618 has a diameter less than that of the piston stem 602, thereby forming the piston seat 604. The compression chamber 616, as illustrated, is a half a decagon, however other configurations can be used that allow the valve system to function as described herein. It is critical, however, that the proximal end of the flow tube 622 be dimensioned to sealably engage the discharge valve 402. The sides 620 of the piston 600 have an outer diameter greater than the stem 602 to form the lateral extension 606. The open end of the chamber wall 620 is notched to form a piston spring seat 610. Although the interior diameter of the chamber 616, as formed by the interior chamber walls 608 is not critical, it must be dimensioned to interact with the spring 700 and valve 400, as described hereinafter.

Figure 5:
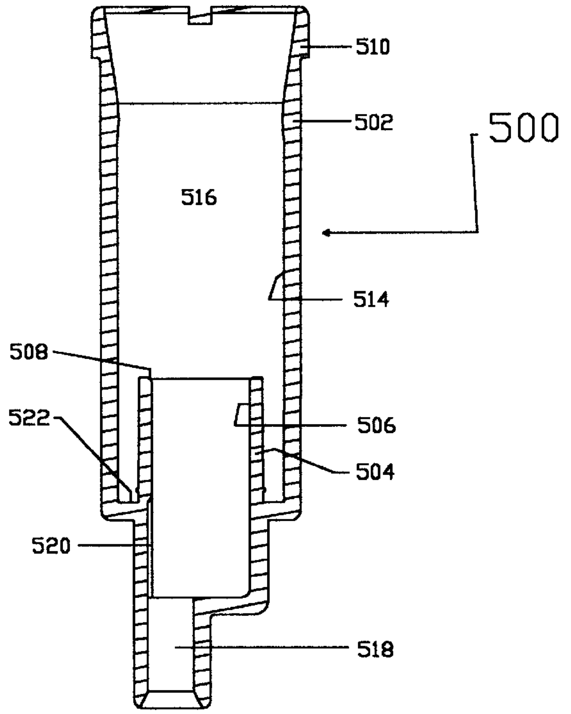
FIG. 5, is a cross-sectional view of the piston cylinder of the spray pump of FIG. 1.

The piston 600 is slidably housed within the piston cylinder 500. The piston cylinder 500, as illustrated in detail in FIG. 5, is an elongated member open at each end. The distal end of the cylinder 500 has a flanged rim 510 that is dimensioned to interact with the flange indent 122 of the container cap 120. The flanged rim 510 is seated within the flange indent 122. As well known in the art, air is permitted to leak into the container, between the flanged rim 510 and the flange indent 122, to prevent a vacuum from forming within the container as liquid is withdrawn from the container during successive cycles of the pump The vertical wall 502 reduces in diameter at the proximal end to form the cylinder neck 516. The valve cylinder wall 504 is parallel to, and set in from, the cylinder wall 502. The valve cylinder wall 504 is on the same plane as the cylinder neck 512 to permit the valve 400 to run smoothly within the valve cylinder 504. The space between the parallel valve cylinder wall 504 and cylinder wall 502 forms the spring seat 522.

Figure 9A:
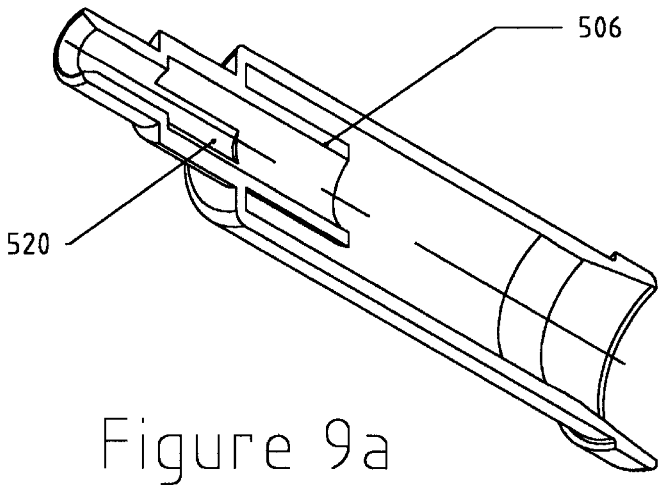
FIG. 9*a*, is a perspective cross-sectional view of the piston cylinder of FIG. 5, viewed toward the priming groove.
Figure 9B:
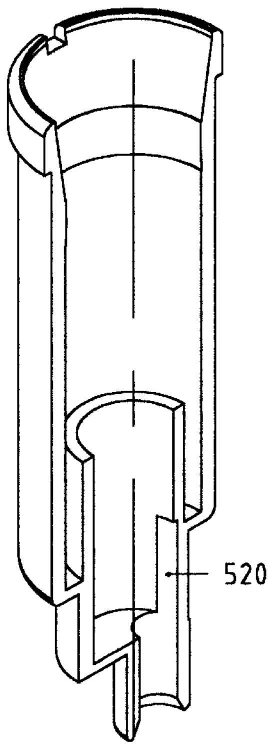
FIG. 9*b*, is a perspective cross-sectional view of the piston cylinder of FIG. 5, perpendicularly to the view of FIG. 9*a;*
Figure 9C:
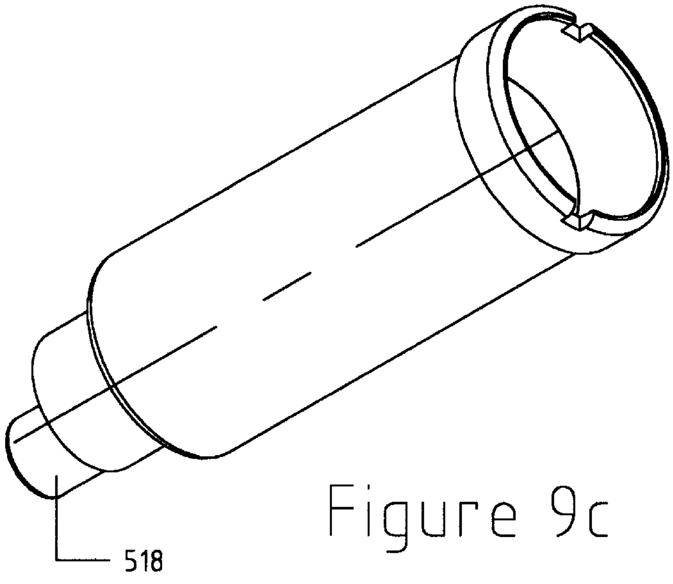
FIG. 9*c*, is a perspective view of the piston cylinder of FIG. 5, as viewed from the upper end.

During the first stroke, or first few strokes of the piston, the pump must be primed. This is accomplished during the initial compression stroke of the piston, due to the groove 520 along the interior wall of the piston inner valve cylinder 504. The groove 520, illustrated in FIGS. 9*a* and 9*b*, permits the air to escape through the dip tube, which is placed of center in alignment with the groove.

Figure 4:
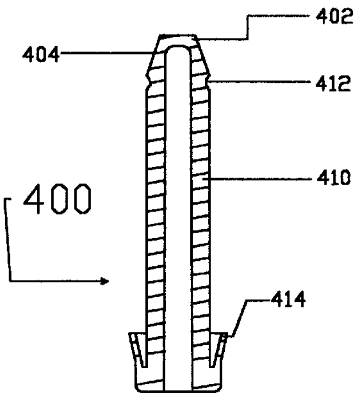
FIG. 4, is a cross-sectional view of the valve element of the spray pump of FIG. 1.

The design and dimension of the dual valve member 400, as shown in FIG. 4, allows it to be mounted within the piston cylinder 502 as well as move freely within the valve cylinder 504. The dual valve member 400 includes a conical upper discharge valve 402 at the distal end and a lower inlet valve at the proximal end. The discharge valve 402, in conjunction with the sealing edge 612 of the piston 600, precludes the flow of fluid, during compression, from the compression chambers 615 and 516 into the spray nozzle cap 102.

The valve seal 414 functions as an inlet valve, and prevents the fluid which is being compressed within the compression chamber from leaking into the container. The lower inlet valve is a deformable annular seal 414 of the chevron valve type and is dimensioned to provide a fluid tight seal with the inner surface 506 of the valve cylinder 504. When the valve 400 is at its uppermost position, the seal 414 is proximate the upper edge 508 of the valve cylinder 504, thereby permitting liquid to flow between the seal 414 and the upper edge 508. The deformable annular seal 414 is dimensioned to enter into fluid tight sealing engagement with the inner surface 506 during the compression stroke of the piston 600. During the upward movement of the piston 600, fluid is drawn up the fluid tube and permitted to flow between the seal 414 and the upper edge 508 when the pump 100 is at rest. During the upward motion of the piston 600, the piston compression chamber 512 expands, producing a suction that draws fluid from the container, past the inlet valve 414, and into the piston compression chamber. Due to the outward flare of the inlet valve 414, in the direction away from the inlet side, fluid can pass the inlet valve 414, under the reduced pressure in the compression chamber. The separation between the inlet valve seal 414 and the upper edge 508 provides a positive open passage for liquid. At the distal end of the valve 400 is a spring retaining groove 412 that is dimensioned to receive the spring 700 as described hereinafter. The groove 412 must have a curvature slightly greater that the curvature of the spring 700 to prevent the spring from moving along the length of the valve body 410.

Once primed, the discharge of compressed fluid is accomplished through the use of a novel compound spring 700. The use of a compound spring provides a unique advantage. The force that drives the piston 600 towards its maximum upward position and the force that drives the valve 400 into sealing engagement with the piston 600 can be independently varied. If the fluid contained within the container has a high viscosity, it is necessary to use a base spring having a resistance to compression greater than that required for a low viscosity fluid. Similarly, a higher volume of liquid requires a higher degree of force. If the force driving the valve into sealing engagement with the sealing edge 612 increased directly with stiffness of the spring 700, it would be difficult to obtain the required opening of the discharge valve during the spray discharge step. The use of the compound spring provides a single component that provides two, independently variable functions. The varying of the stiffness of a spring is well known in the art, and can be accomplished through changes in the coil diameter, distance between adjacent loops, or varying the characteristics of the spring material itself. Preferably, the change in stiffness is achieved by changes in the coil diameter, and/or changes in the distance between loops of the coil. Additionally the force of the spring varies proportionally with the amount of compression. The use of a separate and fixed compression spring element engages the outlet valve in a constant force of closure, regardless of the movement in the piston.

Figure 8:
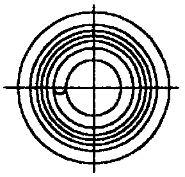
FIG. 8, is a top plan view of the compound spring of FIG. 7.
Figure 7:
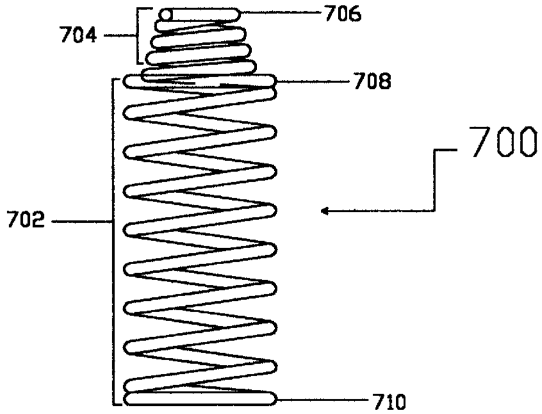
FIG. 7, is a side view of the compound spring of the spray pump of FIG. 1, in the uncompressed condition.
Figure 6A:
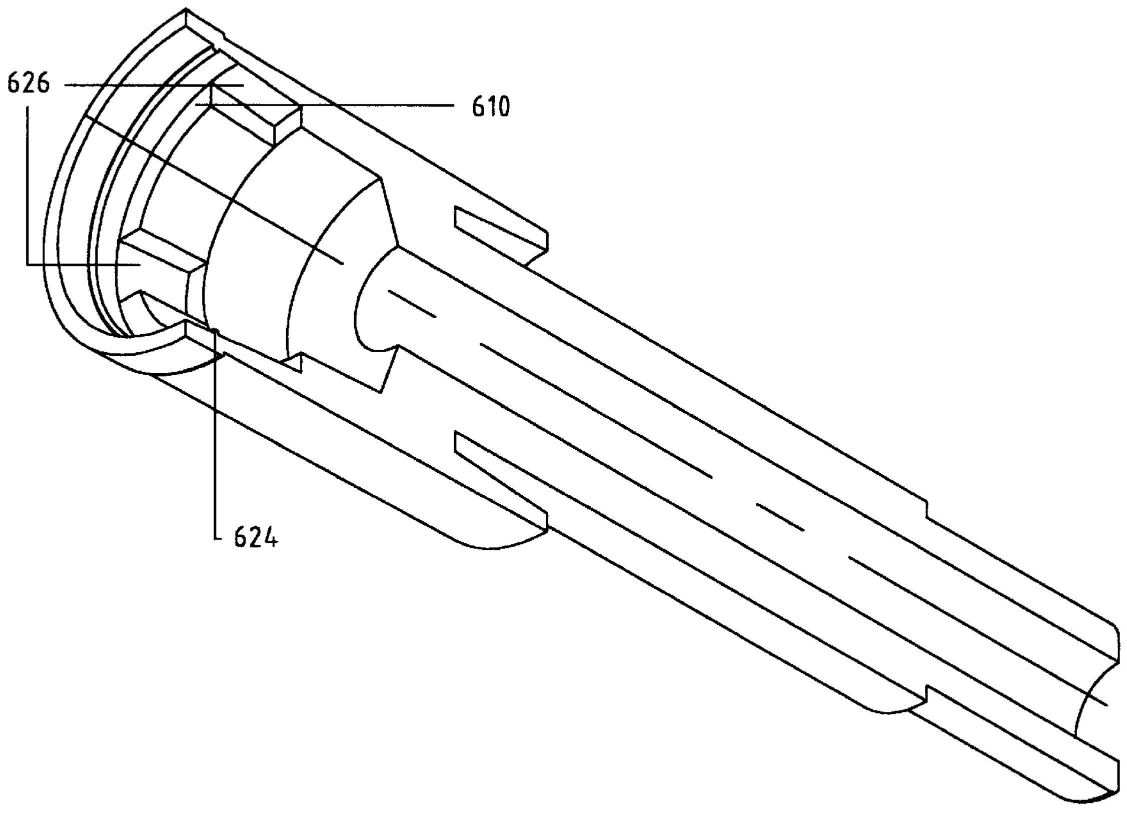
FIG. 6*a*, is a cross-sectional perspective view of the piston element of the spray pump of FIG. 6.

The upper valve engaging loop 706, of the compound spring neck 704, illustrated in FIGS. 7 and 8, locks into the spring retaining groove 412. The inner diameter of the spring body 702 must be slightly greater than the inner valve cylinder 504 and less than the cylinder body 502 to permit the spring body 702 to be seated on the piston cylinder spring seat 522. The transitional rim 708 of the spring body 702, engages the piston spring seat 610. Thus, the stiff, spring body 702 of the spring 700 forces the piston 600 towards its uppermost position, while independently, the valve 400 is forced towards its uppermost position. FIG. **6*a* shows clearance openings 626 in the seat 610. The clearance allows the transitional rim 708** a horizontal seat and a continuation towards the reduced part of the coil.

The preferred embodiment of the invention as described uses a pump configuration with a minimum number of parts. However, other embodiments can be accomplished by the variation of either the inlet and/or outlet valves, or by increasing the number of parts. The inlet valve can be of the type where there is a check valve. The valve member can be a simple rod to slidingly engage a movable sleeve or gasket, as in U.S. Pat. No. 3,331,559. The inlet valve can be a member of a softer material that opens and closes due in part to pressure buildup, as in U.S. Pat. No. 4,389,003. The outlet valve usually has a valve member closing the outlet, and this may occur closer or farther from the dispensing point. Even the placement of the inlet valve may change. Indeed the embodiment of the pump can be completely different, and the dual action spring can still be applied to generally reduce the cost and improve the performance of any given embodiment.

Figure 10:
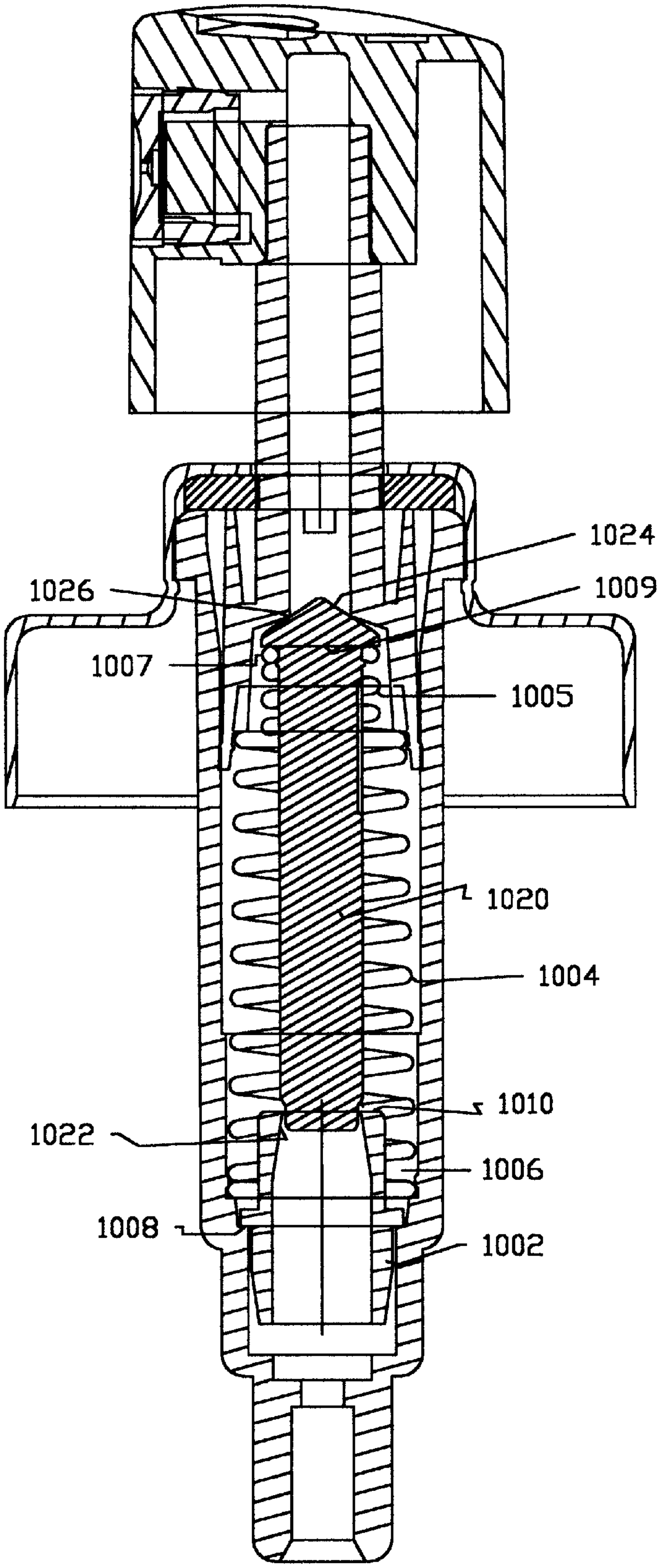
FIG. 10 is a fragmentary cross-sectional view of an alternative embodiment of the spray pump device, showing the spray cap, and pump mechanism in its normal state.

FIG. 10 shows an alternative embodiment of the invention. The main variation is the inclusion of a loss motion valve 1002, as the inlet valve. The design is as presented in copending Patent Application No. 09/122,573, now U.S. Pat. No. 6,032,833, the disclosure of which is incorporated herein by reference, as though recited in full. The functioning is equivalent as the one described therein. The performance is however, improved by having separate force control over the piston up and down motion and the upper valve seal through the use of the dual action spring 1010.

The dual action spring 1004, can be essentially identical to the dual action spring structure as shown in FIGS. 7 and 8. The lower end 1006, of the spring 1004, serves to limit the upward movement of the lost motion inlet valve 1002, and the ledge or seat 1008 serves to limit the downward movement of the lost motion valve 1002. The valve stem 1020 functions much in the same manner as the valve 410 of FIG. 1. The principal difference lies in that the valve stem 1020 carries the lost motion inlet valve 1002 along with it, within the limits of the lower end 1006 of the spring 1004 and the seat 1008. In this embodiment, the upper end of the inlet valve 1002 breaks its liquid and air tight connection with the valve stem 1020, when the upper, reduced diameter section 1022 is positioned within the inlet valve. Thus, the reduced diameter section 1022 is dimensioned to be in sealing engagement with the main body section of the stem 1020, but to permit liquid or air flow between the inner valve 1002 and the reduced diameter section 1022.

As in the case of the outlet valve structure of FIG. 1, the upper end 1024 of the valve stem 1020 is biased against the outlet port 1026 by the upper section 1005 of the dual action spring 1004. The uppermost loop 1007, of the upper section 1005 of the dual action spring engages a lower surface 1009, of the valve stem upper end 1024. It should be noted that the upper end of the valve stem 1020 can be of the configuration of the valve stem 410 of FIG. 1, and the inlet valve of FIG. 1, can be in the form of the lost motion inlet valve of FIG. 10.

METHOD OF OPERATION OF THE SPRAY PUMP

The pump 100 at rest, is illustrated in FIG. 1. The spring neck 704 biases the conical valve 402 in the upward position, thereby placing the conical upper end 402 in sealing engagement with the sealing edge 612. The interior surface of the piston is provided with a groove 624 to engage and retain the end loop 708 of the wide section of the compound spring 700. Simultaneously, the lower spring body 702 biases the piston 600 to its uppermost position, maintaining the piston's lateral extension 606 in firm contact and sealing engagement with the container cap seal 109.

Figure 2:
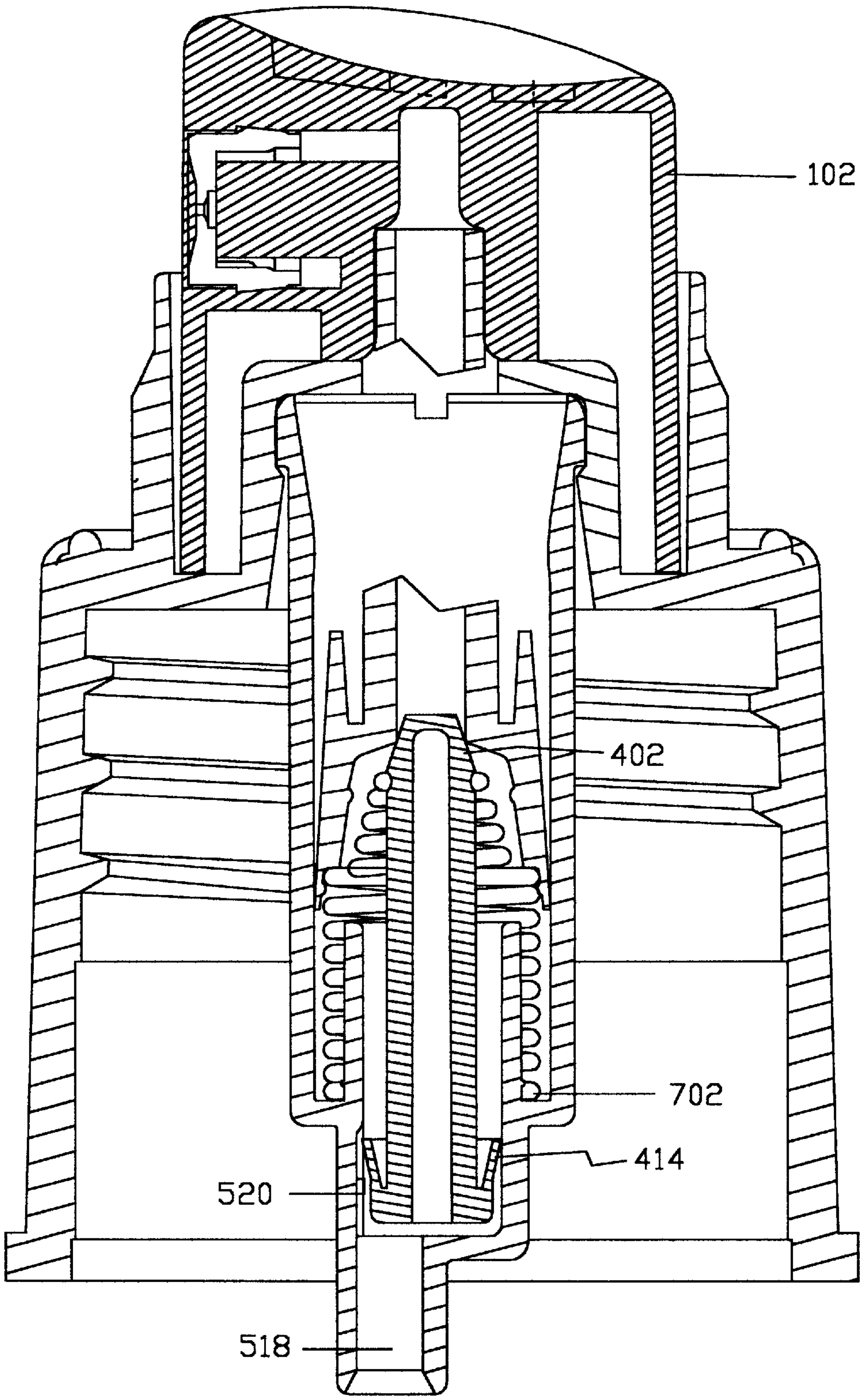
FIG. 2, is a fragmentary cross-sectional view of the spray pump device of FIG. 1, showing the pump in the fully compressed position.

The next stage of operation is illustrated in FIG. 2, wherein the spray cap 102 has been depressed against the compression resisting force of the spring body 702. During the first few pumping cycles, this action serves to prime the pump, by forcing the compressible air past the valve seal 414. As the valve seal 414 passes into the region of the groove 520, the air is forced through the groove 520, past the valve seal 414 and into the chamber 516. As well known in the art, air is a compressible fluid, and therefore it would merely compress and expand without an appropriate priming step. The venting of the compressed air into the container body, by permitting the air to leak past the valve annular seal 414, serves to discharge the air from the piston chamber through the dip tube into the container. Once the air is discharged from the compression chambers 516 and 616, after one or two stroke cycles, liquid is drawn into the vacuum thus formed in chambers 516 and 616.

The fully depressed position is attained when the spray cap edge 106 comes into contact with the spray container cap ledge cap seat 108. Alternatively, the movement of the spray cap 102 toward the container cap 120 can be limited by the lower edge of the piston receiving notch 110 coming into contact with the cap ledge 124.

The compression chamber includes both the upper compression area 616 and the cylinder compression area 516. The compression areas are bound by the interior surface 608 of the chamber 620, between the sealing edge 612 and the lower most edge 614, as well as the interior walls of the cylinder 502. Within the cylinder 516, the compression area is defined by the exterior walls of the inner valve cylinder 504, and the outer surface of the valve stem 410.

The compression causes the valve seal 414 to enter into the inner valve cylinder 504 in sliding, fluid tight engagement with the inner surface 506. As the piston 600 and valve 400 are compressed, air is forced from the container along groove 520.

Figure 3:
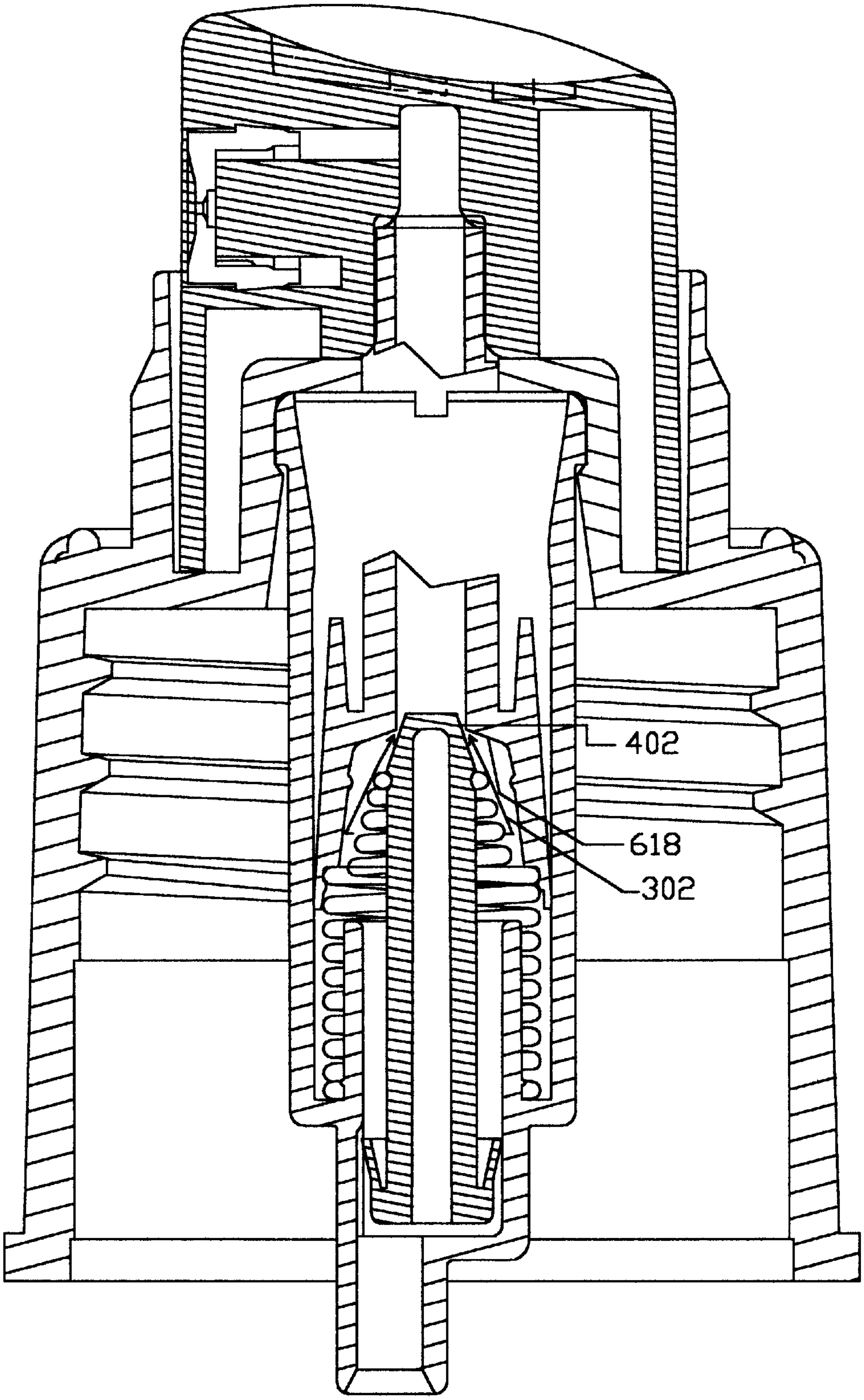
FIG. 3, is a cross-sectional view of the spray pump device of FIG. 2, showing the discharge or outlet valve, in the open position, during the final compression/discharge stage.

The spray nozzle cap 102 is depressed against the force of the spring body 702, decreasing the volume of the compression chamber until, as illustrated in FIG. 3, the fluid pressure between the conical valve 402 and the inner surface 618 is greater than the force exerted by the spring neck 704. As stated heretofore, the coils of the spring neck 704 offer less resistance to compression than the lower spring body 702. Thus, when a predetermined compressive force is developed within the compression chambers 616 and 516, the pressure between the inner wall of piston chamber 608 and the conical discharge valve 402, forces the valve 400 in a downward direction. Thus, the sealing surface of the conical discharge valve 402 is moved away from its engagement with the valve engaging edge 612, thereby permitting the fluid under compression to pass between the conical discharge valve 402 and the piston edge 612, as shown by arrows 302, into the spray cap 102, and out through the spray nozzle 104, in the form of a mist.

It should be noted that there is an increase in volume of the compression chamber, as the inlet valve end of the valve 400 moves downwardly within the inner cylinder 504. Concurrently, there is a decrease in volume of the compression, as the piston moves downwardly, toward the upper end of the inner cylinder 504. The change in volume due to the movement of the inlet valve is minimal compared to the change in volume which results from movement of the piston. The outer diameter of the valve stem 410 is close in size to the inner diameter of the inner cylinder 504, and therefore the volume between these two elements is small. The dimension difference between the outer diameter of the valve stem 410 and the inner diameter of the inner cylinder 504, is merely sufficient to accommodate the valve seal 414.

Once the finger pressure on the spray nozzle cap is released, the cap 102 is permitted to rise under the force of the piston spring section 702. During the upward movement of the piston 600, the volume of the compression chambers 616 and 516 increases. The vacuum formed by this expansion draws the liquid upwardly through a dip tube (not shown), past the inlet valve seal 414, into the expanding compression chambers 616 and 516.

The piston compression chamber is now filled with liquid and is primed and ready to dispense liquid in the form of a fine spray or mist.

| GLOSSARY OF TERMS | |
|---|---|
| 100 | pump assembly |
| 102 | spray cap |
| 104 | spray nozzle |
| 106 | spray nozzle cap lower edge |
| 108 | container cap seat |
| 109 | container cap seal |
| 110 | piston receiving notch |
| 120 | container cap |
| 122 | flange indent |
| 124 | cap ledge |
| 126 | container seal |
| 400 | valve |
| 402 | conical upper discharge valve |
| 404 | seal surface for discharge valve end 404 |
| 410 | cylindrical valve stem |
| 412 | spring retaining groove |
| 414 | inlet valve |
| 500 | piston cylinder |
| 502 | piston cylinder body |
| 504 | piston inner valve cylinder |
| 506 | inner surface of inner valve cylinder 504 |
| 508 | upper edge of inner valve cylinder 504 |
| 510 | flanged rim |
| 512 | cylinder neck |
| 516 | piston compression chamber |
| 518 | dip tube entry |
| 520 | vent groove |
| 600 | piston |
| 602 | piston stem |
| 604 | seat for nozzle cap |
| 606 | lateral seat |
| 608 | inner wall of piston chamber |
| 610 | piston spring seat |
| 612 | piston 600, valve engaging edge |
| 616 | piston cylinder compression area |
| 618 | piston head |
| 620 | piston chamber |
| 622 | piston flow tube |
| 624 | piston skirt inner groove |
| 626 | piston spring seat clearance |
| 700 | compound spring |
| 702 | piston spring section of compound spring 700 |
| 704 | valve section of compound spring 700 |
| 706 | spring retaining groove |
| 1004 | dual action spring |
| 1005 | upper section of dual action spring |
| 1007 | upper loop of upper section 1005 |
| 1008 | seat for lower end of dual action spring |
| 1009 | flange surface of outlet valve 1024 |
| 1010 | lost motion valve |
| 1020 | valve stem |
| 1022 | reduced diameter region of valve stem |
| 1024 | outlet valve region at upper end of valve stem 1020 |
| 1026 | upper surface of outlet valve 1024 |

What is claimed is:

1. A manual spray pump assembly, comprising:

a piston cylinder;

a reciprocating piston;

a valve member; and a compound spring, said compound spring having:

a first compression region and a second compression region, said first region being coaxial with said second region, and having a first end and a second end, and said second region having a first end and a second end, said first region second end being fixed to said second region first end, said reciprocating piston being within said piston cylinder, said piston cylinder having an interior compression chamber and a valved outlet from said compression chamber, said valve member being positioned within said piston cylinder and having an outlet valve end, said valve member being in biased engagement with said compound spring second compression region second end and biased toward fluid tight engagement with said piston cylinder valved outlet, said compound spring first region first end being in biased engagement with said piston cylinder, and said compound spring first region, second end being in engagement with and movable with said reciprocating piston.

2. The manual spray pump assembly of claim 1, wherein said reciprocating piston has an annular shoulder and said compound spring first region, second end is in biased engagement with said reciprocating piston annular shoulder.

3. The manual spray pump assembly of claim 1, wherein said valve member has an annular shoulder at its valve outlet end, and said compound spring second region, second end is in biased engagement with said valve member annular shoulder.

4. The manual spray pump assembly of claim 1, wherein said piston cylinder has an inlet end and said valve member has a valve inlet end, and said valve member inlet end being movable between a first position and a second position, when said valve member is in said first position said valve member inlet end is in restricted liquid flow engagement with said piston cylinder inlet end and said when said valve member is in said second position, said valve member inlet end is out of liquid flow engagement with said piston cylinder inlet end.

5. The manual spray pump assembly of claim 4, wherein said piston cylinder has an inner cylindrical wall, said valve member inlet end being positioned for reciprocal movement within said piston cylinder inner cylindrical wall, and said valve member engaging said piston cylinder inner cylindrical wall when said valve member is in said first position.

6. The manual spray pump assembly of claim 5, wherein said valve member inlet end has an annular skirt.

7. The manual spray pump assembly of claim 6, wherein said spray pump assembly is self priming and further comprising at least one vent groove on the inner surface of said inner cylindrical wall, said at least one vent groove being positioned for cooperation with said annular skirt during the final portion of the reciprocal movement of said valve member within said piston cylinder inner cylindrical wall, said inner cylindrical wall having an axial length that is less that the axial length of said inner cylinder wall, said annular skirt being positioned within said axial length when said valve member is in said first position and is beyond said axial length when said valve member is between said first position and said second position.

8. The manual spray pump assembly of claim 5, wherein said valve member inlet end is a chevron valve having an annular skirt, said annular skirt having an increasing diameter in the direction away from said inlet end.

9. The manual spray assembly of claim 5, said piston cylinder having an outer cylindrical wall and a concentric inner cylindrical wall, said compound spring second region first end is seated on a ledge between said piston cylinder inner cylindrical wall and said piston cylinder outer cylindrical wall.

10. The manual spray pump assembly of claim 5, wherein said valve member inlet end comprises a lost motion valve.

11. The manual spray pump assembly of claim 10, wherein said lost motion valve includes an annular ring member that is in movable engagement with said valve member inlet end.

12. An atomizer comprising, a container, a liquid within said container, an atomizer nozzle and a pump assembly, said pump assembly being adapted to deliver liquid under pressure to said atomizer nozzle, said spray pump assembly having:

a piston cylinder;

a reciprocating piston;

a valve member; and a compound spring, said compound spring having:

a first compression region and a second compression region, said first region being coaxial with said second region, and having a first end and a second end, and said second region having a first end and a second end, said first region second end being fixed to said second region first end, said reciprocating piston being within said piston cylinder, said piston cylinder having an interior compression chamber and a valved outlet from said compression chamber, said valve member being positioned within said piston cylinder and having an outlet valve end, said valve member being in biased engagement with said compound spring second compression region second end and biased toward fluid tight engagement with said piston cylinder valved outlet, said compound spring first region first end being in biased engagement with said piston cylinder, and said compound spring first region, second end being in biased engagement with and movable with said reciprocating piston.

13. The atomizer of claim 12, wherein said reciprocating piston has an annular shoulder and said compound spring first region, second end is in biased engagement with said reciprocating piston annular shoulder.

14. The atomizer of claim 12, wherein said valve member has an annular shoulder at its valve outlet end, and said compound spring second region, second end is in biased engagement with said valve member.

15. The atomizer of claim 12, wherein said piston cylinder has an inlet end and said valve member has a valve inlet end, and wherein said valve member inlet end being movable between a first position and a second position, said valve member in said first position being in engagement with said piston cylinder inlet end to restrict liquid flow through said piston cylinder inlet end into said piston compression chamber and in said second position said valve member enabling liquid flow through said piston cylinder inlet end into said piston compression chamber.

16. The atomizer of claim 15, wherein said piston cylinder has an outer cylindrical wall and a concentric inner cylindrical wall, said valve member inlet end being positioned for reciprocal movement within said piston cylinder inner cylindrical wall, said valve member engaging said piston cylinder inner cylindrical wall when said valve member is in said first position.

17. The atomizer of claim 16, wherein said valve member inlet end has an annular skirt.

18. The atomizer of claim 16, wherein said valve member inlet end is a chevron valve having an annular skirt, said annular skirt having an increasing diameter in the direction away from said valve member inlet end.

19. The atomizer of claim 16, wherein said spray pump assembly is self priming and further comprising at least one vent groove on the inner surface of said concentric inner cylindrical wall, said at least one vent groove being positioned for cooperation with said annular skirt during the final portion of the reciprocal movement of said valve member within said piston cylinder inner cylindrical wall, said inner cylindrical wall having an axial length that is less that the axial length of said inner cylinder wall, whereby said annular skirt is within said axial length when said valve member is in said first position and is beyond said axial length when said valve member is between said first position and said second position.

20. A self priming manual spray pump assembly, comprising:

a piston cylinder;

a reciprocating piston;

a valve member;

spring means;

a fluid delivery tube receiving inlet; and said reciprocating piston being within said piston cylinder, said piston cylinder having an interior compression chamber and a valved outlet from said compression chamber, said valve member being positioned within said piston cylinder and having an outlet valve end, said valve member being spring biased by said spring means into fluid tight engagement with said piston cylinder valved outlet, said piston cylinder having an inlet end and said valve member having a valve inlet end, said valve member inlet end being movable between a first position and a second position, said valve member, in said first position being in flow restricting engagement with said piston cylinder inlet end in said second position said valve member being out of flow restricting engagement with said piston cylinder inlet end, said delivery tube receiving inlet being at the inlet end of said piston cylinder, and having its longitudinal axis substantially parallel to the longitudinal axis of said piston cylinder, said delivery tube receiving inlet longitudinal axis being radially offset from said piston cylinder longitudinal axis, said delivery tube receiving inlet being tangentially oriented relative to said piston cylinder inlet end.

21. The self priming manual spray pump assembly of claim 20, wherein said piston cylinder has an inner cylindrical wall, said valve member inlet end being positioned for reciprocal movement within said piston cylinder inner cylindrical wall, said valve member engaging said piston cylinder inner cylindrical wall when said valve member is in said first position, said valve member inlet end having an annular skirt, said piston cylinder having an interior surface, at least one vent groove on the inner surface of said piston cylindrical, said at least one vent groove being positioned for cooperation with said annular skirt during the final portion of the reciprocal movement of said valve member within said piston cylinder inner cylindrical wall, said inner cylindrical wall having an axial length that is less that the axial length of said inner cylinder wall, whereby said annular skirt is within said axial length when said valve member is in said first position and is beyond said axial length when said valve member is between said first position and said second position, said at least one vent groove being substantially tangential to said piston cylinder interior surface and said delivery tube receiving inlet.

22. A method of delivering an atomized spray from a manual atomizer, said manual atomizer comprising, a container, a liquid within said container, an atomizer nozzle and a pump assembly, said pump assembly being adapted to deliver liquid under pressure to said atomizer nozzle, said spray pump assembly having:

a piston cylinder;

a reciprocating piston;

a valve member; and a compound spring, said compound spring having a first compression region and a second compression region, said first region being coaxial with said second region, and having a first end and a second end, and said second region having a first end and a second end, said first region second end being fixed to said second region first end, said reciprocating piston being within said piston cylinder, said piston cylinder having an interior compression chamber and a valved outlet from said compression chamber, said valve member being positioned within said piston cylinder and having an outlet valve end, said valve member being in fixed engagement with said compound spring second compression region second end and biased toward fluid tight engagement between said valve member outlet valve end and said compression chamber valved outlet, said compound spring first region first end being in biased engagement with said piston cylinder, and said compound spring second region, first end being in biased engagement with and movable with said reciprocating piston, comprising the steps of:

pressing on said atomizer against the force of said compound spring first region, compressing fluid within said compression chamber until the compressive forces in said compression chamber are greater that the closure force of said compound spring second region, causing said valve member to be out of fluid tight engagement said compression chamber valved outlet, and discharging an atomized spray from said atomizer nozzle.

* * * * *